United States Patent [19]
Kuwako et al.

[11] 3,984,709
[45] Oct. 5, 1976

[54] MINIATURE ELECTRIC MOTOR

[75] Inventors: Tomohisa Kuwako, Anjo; Toshio Tanase, Beppu, both of Japan

[73] Assignee: Kabushiki Kaisha Tokai Rika Denki Seisakusho, Japan

[22] Filed: Feb. 24, 1975

[21] Appl. No.: 552,526

[30] Foreign Application Priority Data
Feb. 25, 1974 Japan.............................. 49-21360
Feb. 25, 1974 Japan.............................. 49-21361

[52] U.S. Cl........................... 310/40 MM; 310/154; 310/164
[51] Int. Cl.²......................................... H02K 19/00
[58] Field of Search................ 310/154, 49, 40 MM, 310/162–165, 268, 49, 198, 181, 68, 68 A, 112–114

[56] References Cited
UNITED STATES PATENTS

| | | | |
|---|---|---|---|
| 3,330,975 | 7/1967 | Osterwalder | 310/164 |
| 3,348,083 | 10/1967 | Inariba | 310/164 |
| 3,571,638 | 3/1971 | Inariba | 310/164 |
| 3,614,495 | 10/1971 | Suzuki | 310/162 |
| 3,684,907 | 8/1972 | Hinachi | 310/164 |
| 3,826,939 | 7/1974 | Mori | 310/154 |
| 3,878,414 | 4/1975 | Harakawa | 310/164 |
| 3,894,252 | 7/1975 | Miwa | 310/181 |

*Primary Examiner*—R. Skudy
*Attorney, Agent, or Firm*—Woodhams, Blanchard and Flynn

[57] ABSTRACT

A miniature electric motor with a rotor having pole teeth simultaneously magnetizable in opposite polarities upon energization of an exciting coil, being provided with high magnetic reluctance grooves for magnetically separating each pole tooth from the adjacent ones.

15 Claims, 18 Drawing Figures

MINIATURE ELECTRIC MOTOR

This invention relates to a miniature electric motor and more particularly to a miniature electric motor with a rotor of a soft magnetic material having pole teeth each adjacent two of which are simultaneously magnetized in alternating opposite magnetic polarities upon energization of exciting coil, which is by far improved in output efficiency and frequency response.

The output efficiency means an efficiency for converting an electrical input to a mechanical output. A high output efficiency could save power consumption of a motor, facilitate minimizing the size of the motor and minimize heat generation due to by far reduced loss. Frequency response indicates how well a motor can synchronize with the frequency of a power supply and is an index of the operational stability of the motor.

In a conventional miniature electric motor with a permanent magnet rotor, it is extremely difficult to reduce the moment of inertia and there is a problem in frequency response because the shaping of the rotor is extremely restricted due to limited processability of the material of the permanent magnet rotor such as barium ferrite, alnico etc. or because of the specific gravity of such a material. Even if the moment of inertia can be reduced to some extent, output torque is reduced as a result and output efficiency is lowered accordingly. Thus, a motor construction of this type is applicable only to a low torque motor. In other words, the output efficiency and the frequency response is in an antinomic relationship in the conventional electric motor of this kind. On the other hand, a conventional electric motor with a rotor having pole teeth of a soft magnetic material has another disadvantage in magnetic efficiency because the pole teeth are simultaneously magnetized in a single polarity (north or south), leaving the output efficiency and the frequency response unsatisfactory.

It is therefore an object of the present invention to provide a miniature electric motor with a rotor having pole teeth adapted to be simultaneously magnetized in north and south magnetic polarity which is capable of by far improving an output efficiency and frequency response.

Essentially according to the present invention, there is provided in an electric motor having a rotary shaft, a rotor made of a soft magnetic material and fixed to said rotory shaft in a concentric relation therewith, a permanent magnet stator concentric with said rotary shaft and magnetized radially to provide north and south poles alternating at equal angular spacings, a casing including a yoke made of a soft magnetic material and forming an alternating magnetic circuit with said rotor, and an annular exciting coil concentric with said rotary shaft and interposed between said rotor and said yoke of the casing; the improvement characterized by said rotor having a circular portion lying in a redial plane through said shaft facing the magnetized face of the permanent magnet stator and circumferentially divided into a plurality of pole teeth by high magnetic reluctance means which magnetically separate said pole teeth from the respective adjacent ones to simultaneously magnetize the adjacent pole teeth in opposite magnetic polarities alternating upon the magnetic field produced by said annular exciting coil.

The invention will be better understood from the following description taken in connection with the accompanying drawings in which.

Figure 5:
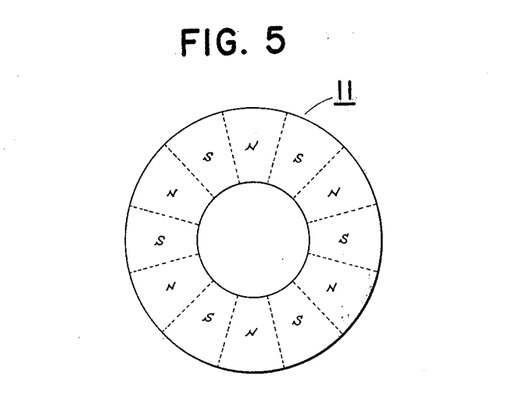
FIG. 5 is a plan view of a permanent magnet stator according to the present invention.

Referring now to FIGS. 1 to 7, there is shown one embodiment of the present invention. Numeral 1 designates a rotary shaft. A first bearing 2 and a second bearing 3 are fitted around said rotary shaft at its opposite end portions. An intermediate yoke 4 made of a soft magnetic material is fixed to said second bearing 3. Between said intermediate yoke 4 and first bearing 2, a boss member 7 made of a magnetic material is fixed to said rotary shaft 1 through washers 5 and 6. A first casing member 8 made of a soft magnetic material and having an inner edge fixed to the intermediate yoke 4 and an outer edge bent to extend in the axial direction of the rotary shaft 1. Inside said casing member 8, an annular exciting coil 9 is fixed to said intermediate yoke 4. A second casing member 10 of a nonmagnetic material is fixed at its inner edge to the first bearing 2 and bent at its outer edge to fit around said first casing member 8. Inside said second casing member 10 is fixed a permanent magnet 11 made of barium ferrite etc. Said permanent magnet 11 is formed in an annular shape and magnetized radially on its surface to provide north and south poles alternating at equal angular spacings as shown in FIG. 5.

Figure 3:
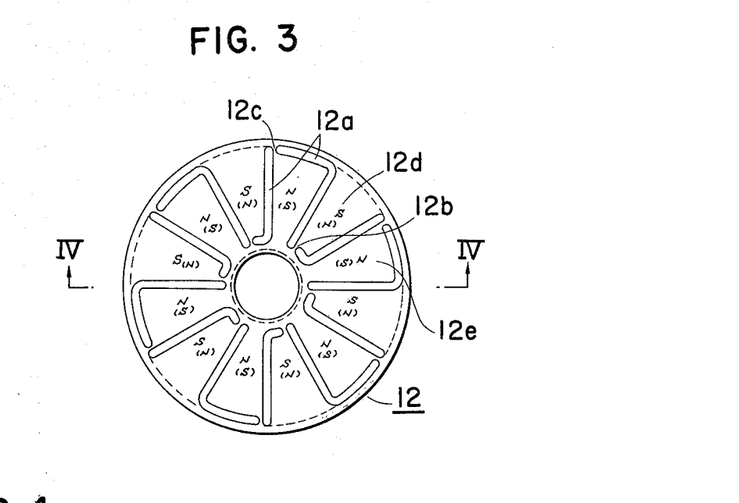
FIG. 3 is a plan view of the pole teeth.
Figure 4:
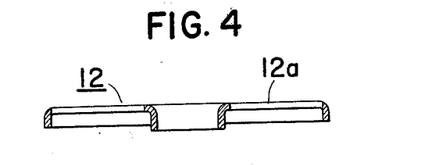
FIG. 4 is a sectional view of the pole teeth taken along line VI—VI.

A rotor 12 is made of a circular iron piece of a soft magnetic material and formed with an inner and an outer edge bent to extend along the rotary shaft 1, i.e. formed with radially inner and outer peripheral flanges. Said rotor 12 is fixed at its inner periphery to the boss member 7 to form a rotor assembly. A circular body portion lying in a radial plane through said rotary shaft 1 facing the magnetized face of the permanent magnet stator 11, has a plurality of slits or grooves 12a of high magnetic reluctance formed in L-shape and radially disposed reversing alternatingly in a circumferential direction to form pole teeth 12d and 12e. Said pole teeth 12d are integral at the outer periphery of the rotor 12 and extend inwardly in said plane while said pole teeth 12e are formed integrally at the inner edge of said rotor 12 and extend outwardly in the plane as shown in FIG. 3. Bridges 12b and 12c across the ends of the respective adjacent grooves 12a are formed narrow enough to neglect possible short circuit of magnetic flux therethrough (to produce high magnetic reluctance between the adjacent pole teeth 12d and 12e), while keeping a sufficient mechanical strength for bridging the adjacent pole teeth 12d and 12e. The number of the pole teeth 12d and 12e corresponds to that of the poles of the permanent magnet stator 11 as shown in FIG. 3 and 5.

Figure 1:
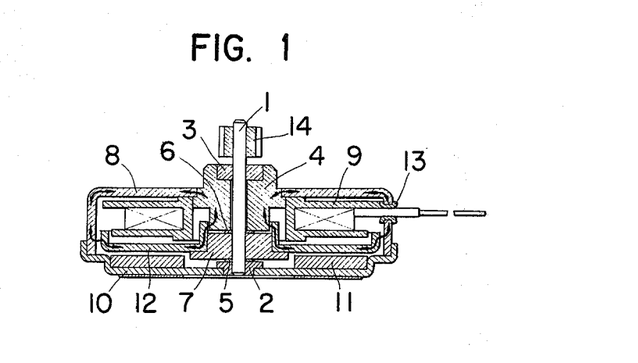
FIG. 1 is a sectional view of one form of a miniature electric motor according to the present invention.

A bush 13 is fitted in an opening of the first casing member 8 and a lead 9a of the annular exciting coil 9 is inserted therethrough. Numeral 14 designates an output gear fixed to the rotary shaft 1.

Figure 2:
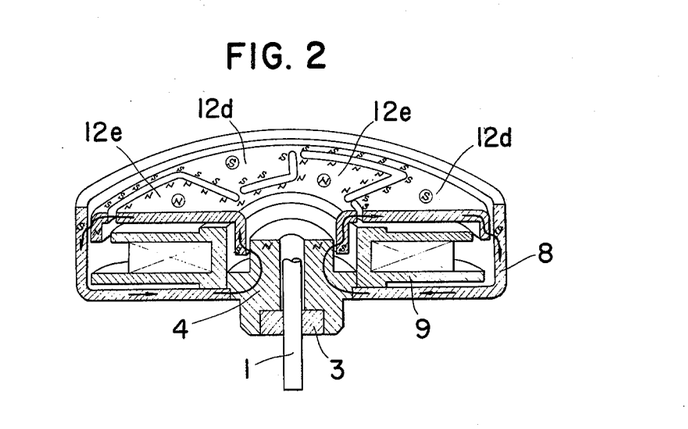
FIG. 2 is an explanatory view of magnetic operation of pole teeth accoring to the present invention.

In the thus constructed electric motor, it will be seen that when a commercial frequency voltage is applied to the exciting coil 9, there is produced an alternating magnetic flux by an electric current flowing therethrough. This magnetic flux forms a circuit including the first casing member 8, the intermediate yoke 4 and the rotor 12 as shown in FIG. 1. Accordingly, in a given half cycle of the power supply voltage, the pole teeth 12d and 12e of the rotor 12 are magnetized simultaneously in south and north, respectively as shown in FIGS. 2 and 3.

Figure 6:
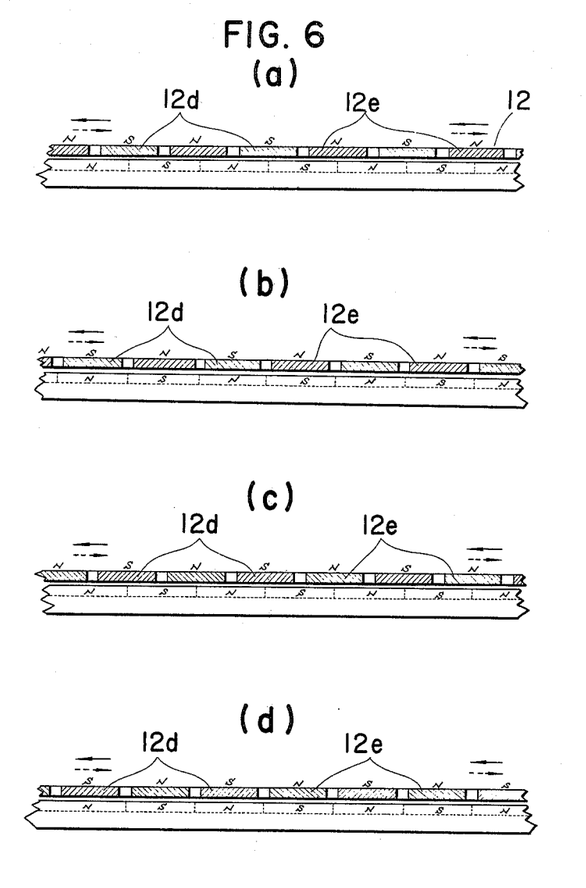
FIG. 6 is a diagram showing the magnetic operation of the motor.

When the exciting coil 9 is not energized, the pole teeth 12e and 12d of the rotor 12 rest in a position where the magnetic flux path from the south pole to the north pole of the permanent magnet 11 has a lowest magnetic reluctance, to wit, in a position midway between adjacent north and south poles of the permanent magnet 11 as shown in FIG. 6 (a). When the commercial frequency voltage is applied to the exciting coil 9 under this condition and in case the pole teeth 12d are magnetized in south and the pole teeth 12e in north as shown in FIG. 2 owing to the magnetic flux produced by the current flowing through the exciting coil 9 and forming the magnetic circuit as mentioned above, the pole teeth 12d are repelled by the respective south poles of the permanent magnet 11 and attracted to the north poles adjacent thereto. Similarly, the pole teeth 12e are repelled by the respective north poles and attracted by the south poles adjacent thereto. Thus, the rotor 12 initiates rotation is a direction of arrow (  ) in FIG. 6 (a). Before said given half cycle of the power supply voltage has been over, the rotor 12 advances to the position as shown in FIG. 6 (b), gaining a moment of inertia. In the following half cycle of the power supply voltage, the pole teeth 12d and 12e change their polarities to north and south, respectively as shown in FIG. 6(c). The rotor 12, then, advances to the position as shown in FIG. 6 (d) due to the similar magnetic interference between the magnetized faces and continues to run in synchronism with the frequency of the power supply. In this connection, it is to be noted that the rotor 12 starts to rotate in a direction of arrow (  ) in FIG. 6 (a) in case the power supply voltage is in the other half cycle than said given half cycle as mentioned above at the start of the operation.

In the present embodiment, the slits or grooves 12a of the rotor 12 may be filled with a material of large magnetic reluctance such as plastic etc. In this construction, the bridge portions 12b and 12c are not necessarily to be provided.

Though the bent portions of the rotor 12 at its inner and outer ends are provided in the above embodiment for increasing areas facing the intermediate yoke 4 and the first casing member 8 to heighten the magnetic efficiency, they are not necessarily required because the magnetic efficiency depends upon relative formation of the intermediate yoke 4 and the first casing member 8. Through the intermediate yoke 4 acts to hold the first casing member 8 in the axial direction of the rotary shaft 1 and serves to form the magnetic circuit with the rotor 12 and the casing member 8 in the embodiment, the casing member 8 may be supported in other manners for example by being fixed to the bearing etc. and the magnetic circuit may be formed without said intermediate yoke 4 by making the inner bent portion of the rotor 2 longer. Further, the number of the pole teeth formed on the rotor 12 is not necessarily to be as much as that of the poles of the permanent magnet 11 but some of them may be omitted so long as the intended purpose can be attained.

Figure 7:
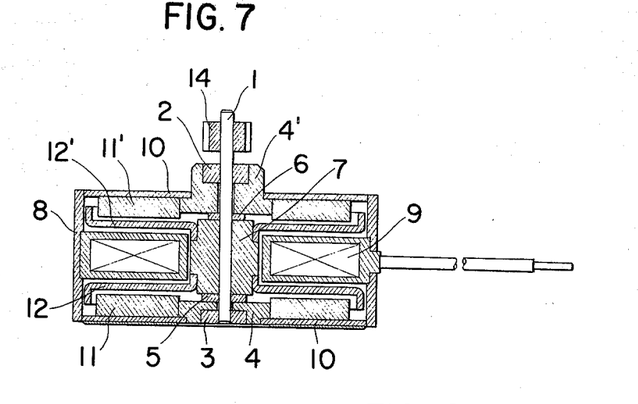
FIG. 7 is another form of a miniature electric motor according to the present invention.

FIG. 7 shows one form of two-phase electric motor according to the present invention, wherein another permanent magnet stator 11', rotor 12' and intermediate yoke 4' are provided at a position opposite to a permanent magnet stator 11, rotor 12 and intermediate yoke 4 identical with those of the foregoing embodiment with reference to one annular exciting coil 9. The permanent magnet stator 11' is staggered from the permanent magnet stator 11 by an electrical angle of 180°.

Figure 8:
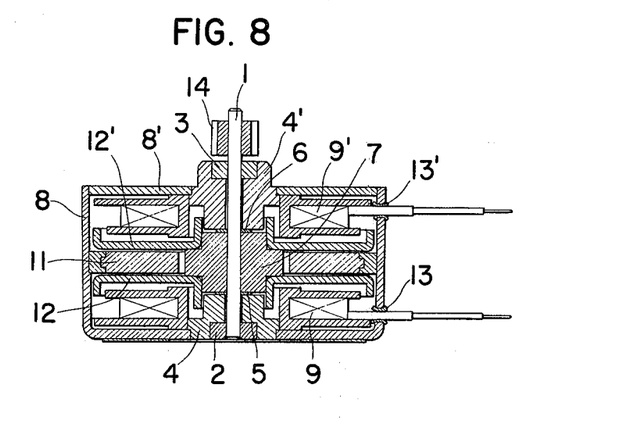
FIG. 8 is a sectional view of a further form of a miniature electric motor of the present invention.

Another from of a two-phase electric motor according to the present invention is shown in FIG. 8. Numeral 1 designates a rotary shaft to which an output gear 14 is secured. A first bearing 2 and a second bearing 3 are fitted around said shaft 1. A first intermediate yoke member 4 and a second intermediate yoke member 4' made of a soft magnetic material are fixed to said first bearing 2 and said second bearing 3, respectively. A boss member 7 of a rotor assembly is secured to the rotary shaft 1 between said first and second intermediate yoke members 4 and 4' through a first washer 5 and a second washer 6. Numerals 8 and 8' indicate a first and a second casing member of a soft magnetic material, respectively. Said casing members 8 and 8' are magnetically connected at the respective outer ends with each other and secured at the inner ends to the first intermediate yoke member 4 and the second intermediate member 4', respectively. A first annular exciting coil 9 and a second annular exciting coil 9' are disposed in a concentric relation to the rotary shaft 1 and fixed to the first casing member 8 and the second casing member 8', respectively. A disc-shaped permanent magnet 11 is fixed between the boss member 7 and the first casing member 8 by a suitable means and magnetized, on its opposite surfaces, similarly to the permanent magnet 11 of the foregoing embodiment as shown in FIG. 5 to provide two magnetized faces. A first bush 13 and a second bush 13' are fitted in openings formed on the first casing member 8 to receive a first lead for the first exciting coil 9 and a second lead for the second exciting coil 9', respectively.

A first rotor 12 and a second rotor 12' made of a soft magnetic material have their respective inner and outer ends bent to extend in the same direction parallel to the rotary shaft 1. Said first rotor 12 and said second rotor 12' are fixed at their respective inner ends to the boss member 7 so as to interpose the permanent magnet 11 therebetween as depicted in FIG. 8. A circular body portion of each of the first rotor 12 and the second rotor 12' lying in a radial plane through said shaft has a plurality of L-shaped slits or grooves 12a or 12a' which are radially arranged reversing alternatingly in the circumferential direction to form pole teeth 12d and 12e or 12d' and 12e' corresponding to the poles of the permanent magnet stator, 11. Said pole teeth 12d and 12d' are each formed integrally at the outer periphery of the rotors 12 and 12', respectively and extend inwardly in said plane, while said pole teeth 12e and 12e' are each formed integrally at the inner end of said rotor 12 and extend outwardly in said plane, respectively as depicted in FIG. 3. The bridges 12b, 12c, 12b' and 12c' across the ends of the respective adjacent grooves 12a or 12a' are formed as narrow as possible to be imparted a large magnetic reluctance to minimize magnetic short circuit therethrough to a neglectable extent, while keeping a necessary mechanical strength for bridging the pole teeth 12d, 12e, 12d' and 12e'. The pole teeth 12d and 12e or 12d' and 12e' are as many as the north and south poles of the permanent magnet 11 as shown in FIG. 3.

When a commercial frequency voltage is applied to the first annular exciting coil 9, alternating magnetic field is produced and it flows through a first magnetic circuit made of the first casing member 8, the first rotor 6 and the first intermediate yoke 4. Accordingly, in a given half cycle of the power supply frequency, south and north magnetic polarities are induced simultaneously in the pole teeth 12d and 12e, respectively as shown in FIG. 2 to form pole teeth having opposite polalities at the same time as shown in FIG. 3. When a similar voltage is applied to the second exciting coil 9', a similar operation is seen in the second rotor 12'.

The thus constructed two-phase miniature electric motor may be applied to a two-phase synchronous motor, a reversible synchronous motor and a pulse motor. The detailed structure for each of the motors will be given hereunder.

Figure 9:
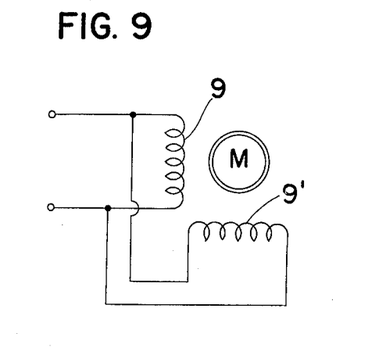
FIG. 9 is a wiring diagram of exciting coils employed in the motor of FIG. 8 used as a synchronous motor.

1. Two-phase synchronous motor: The first rotor 12 and the second rotor 12' are mounted in a relative position where the electrical angle between the pole teeth of the respective rotors 12 and 12' is kept 0° (in the present embodiment, the mechanical angle therebetween is 0°, 60° or odd multiple thereof since the rotors 12 and 12' respectively have twelve pole teeth). The first exciting coil 9 and the second exciting coil 9' are coupled in parallel with each other and connected to the power supply as shown in FIG. 9.

Figure 10:
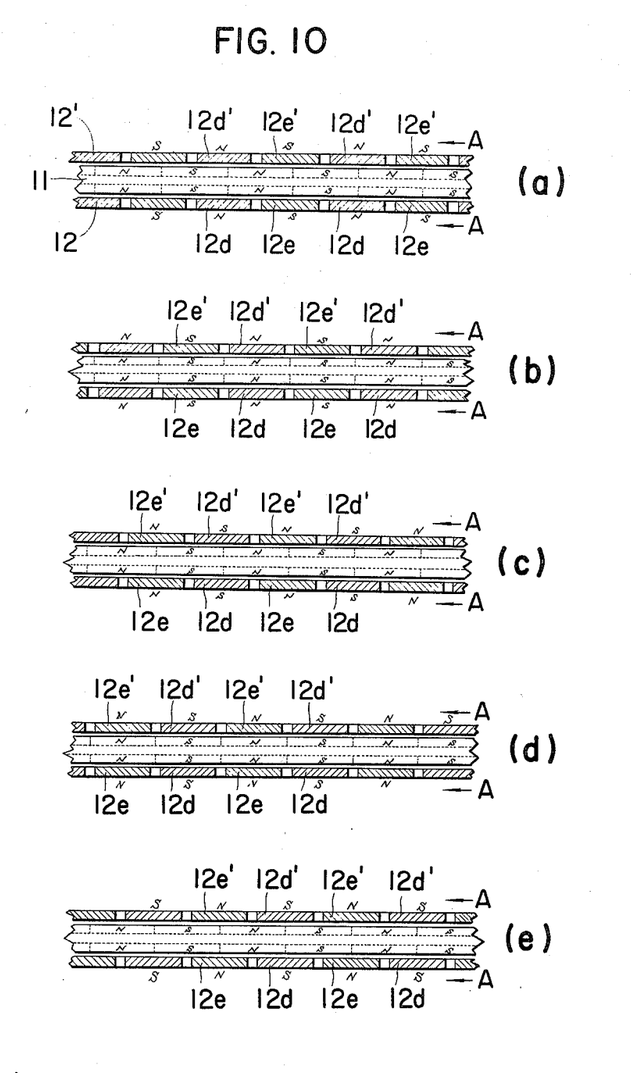
FIG. 10 is a diagram showing magnetic operation of the motor of FIG. 8 used as a synchronous motor.

In rest positions of the first rotor 12 and the second rotor 12', the respective pole teeth 12d, 12e, 12d' and 12e' thereof assume positions midway between adjacent north and south poles of the permanent stator 11 as shown in FIG. 10 (a) because said positions provide the path of minimum reluctance in the stationary magnetic circuit from the north pole to the south pole of the permanent magnet 11.

Upon application of commercial frequency voltages to the first exciting coil 9 and the second exciting coil 9', currents flowing therethrough are of the same phase. Therefore, a first motor member formed of the first rotor 12, the magnetized face of the permanent magnet 11 confronting thereto and said first exciting coil 9 and a second motor member formed of the second rotor 12, the magnetized face of the permanent magnet 11 confronting thereto and said second exciting coil 9' are in the same electrical codition. In this instance, if the pole teeth 12d of the first rotor 12 and the pole teeth 12d' of the second rotor 12' are magnetized in north polarity and the pole teeth 12e of the first rotor 12 and the pole teeth 12e' of the second rotor 12' are magnetized in south polarity, the pole teeth 12d and 12d' are repelled by the adjacent north poles of the permanent magnet 11 and attracted by the adjacent south poles thereof, while the pole teeth 12e and 12e' are repelled by the adjacent south poles of the permanent magnet 11 and attracted by the north poles thereof to run said rotors 12 and 12' in a direction of arrow A. The pole teeth 12d, 12e, 12d' and 12e' advance to the respective positions as shown in FIG. 10 (b) before the given half cycle of the power supply frequency has been over, gaining a moment of inertia. In the following half cycle, the pole teeth 12d and 12d' assume a south polarity and the pole teeth 12e and 12e' assume a north polarity as shown in FIG. 10 (c) and advance to the position of FIG. 10 (c) through strong magnetic interferences between the confronting magnetic faces. Likewise, said pole teeth 12d, 12e, 12d' and 12e' advance to the positions of FIG. 10 (d) and then to the positions of FIG. 10 (e), making the rotation surely and positively synchronizing with the power supply frequency.

In case reversed polarities are induced in the pole teeth at the start, the rotors 12 and 12' run in the reverse direction.

Figure 11:
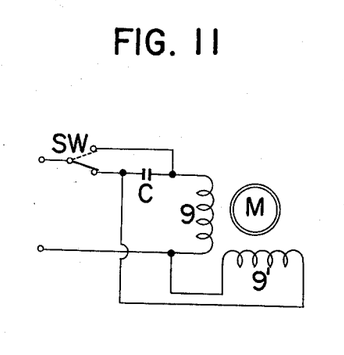
FIG. 11 is a wiring diagram of exciting coils employed in the motor of FIG. 8 used as a reversible motor.
Figure 12:
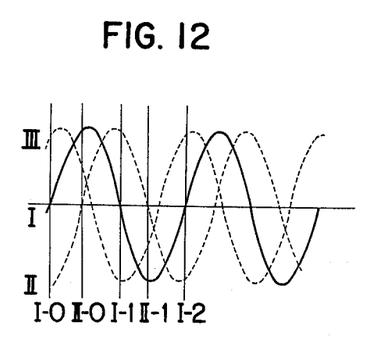
FIG. 12 is shows a waveform of a current flowing through respective exciting coils of FIG. 11.

2. Reversible synchronous motor: The first rotor 12 and the second rotor 12' are mounted so that the respective pole teeth are staggered from each other by an electrical angle of 96° to 120° (in the embodiment, by a mechanical angle of 16° to 20° or integral multiple thereof). The first exciting coil 9 and the second exciting coil 9' are connected as shown in FIG. 11. Stated illustratively, the exciting coils 9 and 9' are coupled in parallel with each other and connected to the A.C. power supply through a switch means SW and a condenser C is connected between the exciting coils 9 and 9'. In FIG. 11, the first exciting coil 9 is in a position to be electrically connected to the power supply. The waveforms of currents flowing through said exciting coils 9 and 9' are shown in FIG. 12. (I) is a waveform of a current flowing through the first exciting coil 9, (II) a waveform of a current flowing through the second exciting coil 9' when the switch SW is in a position of a solid line and (III) a waveform of a current flowing through said second exciting coil 9' when the switch SW is switched to a position of a broken line.

When the switch SW is in the position of the solid line, the current of waveform (I) flows through the first exciting coil 9 and the current of waveform (II) flows through the second exciting coil 9' as mentioned above. In the instance of (I-0) in FIG. 12, the current flowing through the first exciting coil 9 is positive and the pole teeth 12d and 12e of the first rotor 12 assume for example a north polarity and a south polarity, respectively. On the other hand, the current flowing through the second exciting coil 9' is negative and a north and a south polarity are induced respectively in the pole teeth 12d' and 12e' of the rotor 12' as shown in FIG. 13 (a).

In a rest position, the pole teeth 12d and 12e of the first rotor 12 are positioned over the north and the south poles of the permanent magnet 11, respectively and the pole teeth 12d' and 12e' of the second rotor 12' are positioned midway between adjacent north and south poles of the permanent magnet 11. Under this condition, a repelling force is exerted on the first rotor 12. This repelling force, however, does not act to determine the rotational direction since the pole teeth 12d and 12e are positioned centrally over the poles of the permanent magnet 11. On the other hand, both of a repulsion force and an attraction force are exerted on the second rotor 12' because its pole teeth 12d' and 12e' rest intermediate the poles. Due to these forces exerted on said second rotor 12', the rotor 12' starts to rotate together with the first rotor 12 to rotate in a direction of arrow B and gains a moment of inertia.

Figure 13:
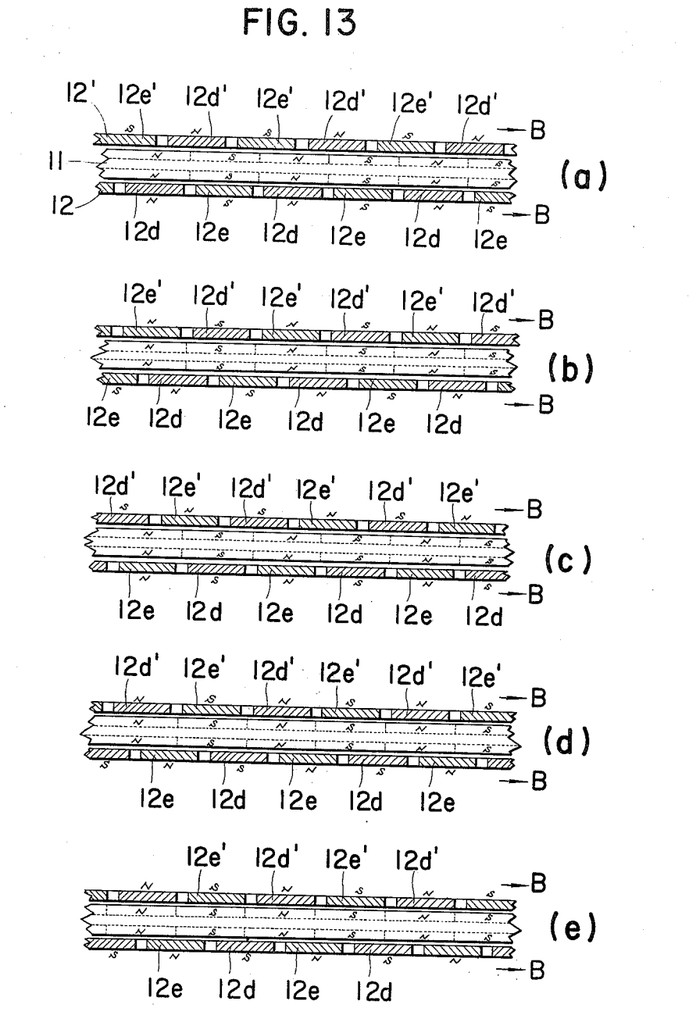
FIG. 13 is a diagram showing magnetic operation of the motor of FIG. 8 used as a reversible motor.

The pole teeth 12d' and 12e' of the second rotor 12' then advance to positions crossing the south poles and the north poles of the permanent magnet 11, respectively, until at a phasic position of (II-0) of FIG. 12, the current flowing through the second exciting coil 12' has become positive, inverting the polarities of the pole teeth 12d' and 12e' of the second rotor 12 to south and north, respectively as shown in FIG. 13 (b). Said second rotor 12', therefore, is subjected to repulsion between the permanent magnet 11 and the pole teeth 12d' or 12e'. At this time, however, a maximum current still flows through the first exciting coil 9 and the pole teeth 12d and 12e of the first rotor 12 are kept in a north and a south polarity stronger than those of the second exciting coil 9. Accordingly, the rotation is further made in the direction of arrow B due to the magnetic interference between the first rotor 12 and the permanent magnet 11 as shown in FIG. 13 (b). When the pole teeth 12d' of the second rotor 12' pass the center of the respective poles of the permanent magnet 11, they receive a repulsion force to afford the rotor assembly a large rotational torque in cooperation with the attracting force to the pole teeth 12d and 12e. At a phasic position of (I-1), (II-1) and (I-2), the rotor assembly is brought into positions of FIG. 12 (c), (d) and (e), respectively through analogous magnetic operation. Thus, the rotor assembly continues to run in the direction of arrow B through every inversion in the polarities of the pole teeth 12d and 12e of the first rotor 12 or 12d' and 12e' of the second rotor 12' depending upon the inversion in the polarities of the currents flowing through the first exciting coil 9 and the second exciting coil 9'.

Figure 14:
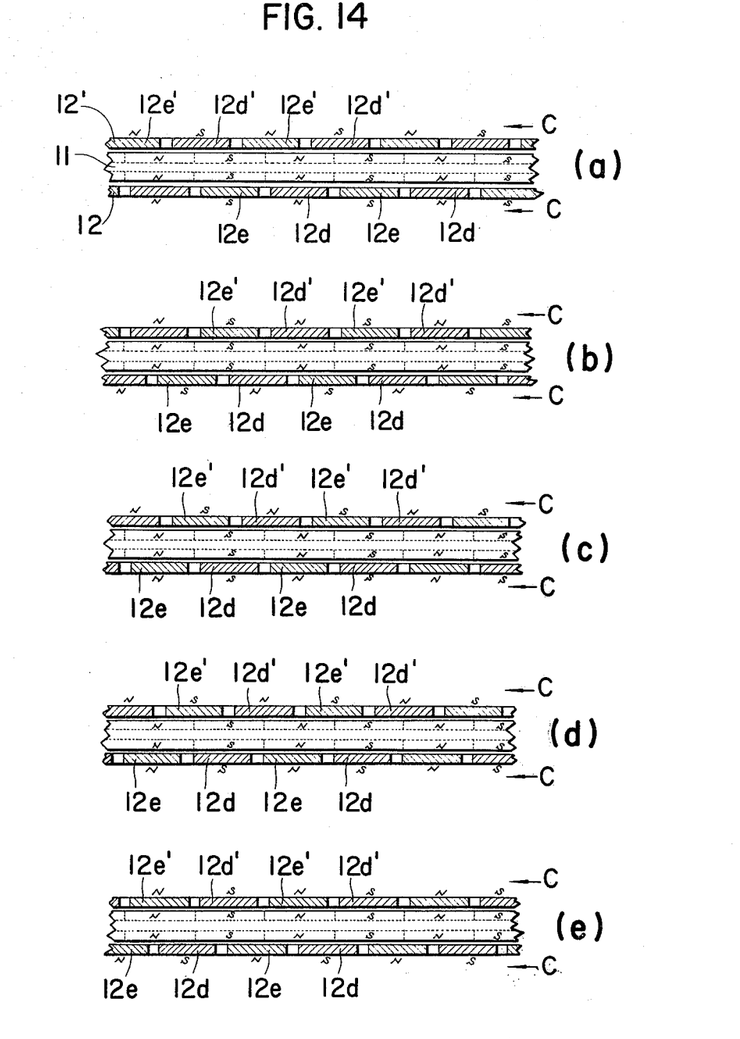
FIG. 14 is a similar diagram showing magnetic operation of the motor of FIG. 8 used as a reversible motor.
Figure 15:
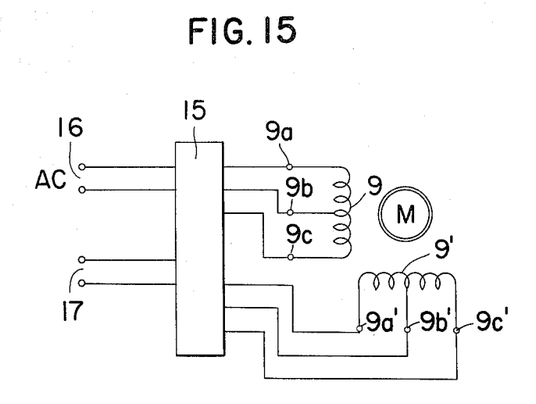
FIG. 15 is a wiring diagram of exciting coils employed in the motor of FIG. 8 used as a pulse motor.

In case the switch SW is turned to the position of the broken line, the current of waveform (III) flows through the second exciting coil 9' as mentioned before. At the phasic position of (I-0) of FIG. 10, the current flowing through the first exciting coil 9 is turned to be positive and the current flowing through the second excitng coil 9' is negative so that north and south poles are induced in the pole teeth 12d and 12e of the first rotor 12, respectively and south and north poles in the pole teeth 12d' and 12e' of the second rotor 12', respectively as shown in FIG. 14 (a).

As a result, the second rotor 12' begins to rotate in a direction of arrow C (opposite to the direction of FIG. 13) by the attraction between the same and the permanent magnet 11. When the pole teeth 12d and 12e of the first rotor 12 are then brought into positions offset from the north poles and the south poles of the permanent magnet stator 11, respectively, repulsion is exerted therebetween to act to continue the rotation in the direction of arrow C in cooperation with the above mentioned attraction, imparting a moment of inertia to the rotors 12 and 12'. Likewise, the rotors make further rotation in a manner analogous with the case of FIG. 13 as shown in FIGS. 14 (b) to (e). Thus, the present reversible motor is capable of selectively reversing its rotation by operation of the switch means SW.

Figure 16:
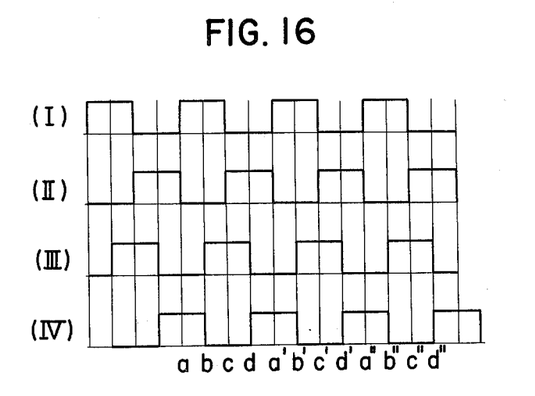
FIG. 16 shows waveforms of input signals to be applied to the motor of FIG. 8 used as a pulse motor.

3. Pulse motor: The first rotor 12 and the second rotor 12' are mounted so that an electrical angle between the respective poles teeth may be 90° (in the embodiment, the mechanical angle therebetween is 15° or odd multiple thereof). Intermediate taps 9b and 9b' are provided on the first and exciting coil 9 the second exciting coil 9', respectively to form substantially four exciting coils. Input signals to be applied across the taps of the first exciting coil 9 and the second exciting coil 9' are selected through a drive circuit 15. To said drive circuit 15, electric power and a control signal are applied. Said drive circuit 15 is adapted to produce pulse signals to be applied to the first exciting coil 9 and the second exciting coil 9' as shown in FIG. 16 in response to the control signal applied. In FIG. 16, (I) is a waveform of a pulse voltage to be applied across the taps 9a and 9b of the first exciting coil 9, (II) a waveform of a pulse voltage to be applied across the taps 9b and 9c of the coil 9, (III) a waveform of a pulse voltage to be applied across the taps 9a' and 9b' of the second exciting coil 9' and (IV) a waveform of a pulse voltage to be applied across the taps 9b' and 9c'. Upon application of these pulse votages to the first exciting coil 9 and the second exciting coil 9', the pole teeth 12d and 12e of the first rotor 12 and the pole teeth 12d' and 12e' of the second rotor 12' are magnetized as shown in Table I. Table I is based upon the case where positive pulse voltages are applied. Then, in case negative pulse voltages are applied, the polarities induced become reverse.

Table I

| energization conditions of exciting coils | polarities induced in pole teeth | | | |
|---|---|---|---|---|
| | 12d | 12e | 12d' | 12e' |
| 9b – 9a + ON | N | S | – | – |
| 9b – 9c + ON | S | N | – | – |
| 9b' – 9a' + ON | – | – | N | S |
| 9b' – 9c' + ON | – | – | S | N |

In FIG. 16, operational regions are expressed on the abscissa and critical points in operation are represented by a, b, c, d. Said critical points form respective operational regions such as region a - b, region b - c, region c - d, region d - a' and so on.

The operations of the exciting coils and the magnetized conditions of the pole teeth are summarized in the following base upon Table I.

In region a - b: at the point a, a positive pulse voltage starts to be applied across the taps 9a and 9b of the first exciting coil 9 to induce north and south poles in the pole teeth 12d and 12e of the first rotor 12, respectively while a positive pulse voltage is being applied across the taps 9b' and 9c' of the second exciting coil 9', magnetizing the pole teeth 12d' and 12e' in south and north, respectively until the point b.

In region b - c: the first exciting coil 9 is kept energized across the taps 9b and 9a until the point c while the second exciting coil 9' is newly applied across the taps 9b' and 9a' with a positive pulse voltage to induce north and south poles in the pole teeth 12d' and 12e' of the second rotor 12', respectively.

In region c - d: a pulse voltage is newly applied across the taps 9b and 9c of the first exciting coil 9 to magnetize the pole teeth 12d and 12e fo the first rotor 12 in south and north, respectively while the second exciting coil 9' is kept energized across the taps 9b' and 9a' until the point d.

In region d - a': the first exciting coil 9 are kept energized across the taps 9b and 9c until the point a' while the second coil 9' are newly applied across the taps 5b' and 5c' with a positive pulse voltage to magnetize the pole teeth 12d' and 12e' of the second rotor 12' in south and north, respectively.

Thus, through these operational regions two of the four exciting coils are in an energized condition and through repetition of the operation as mentioned above, the first and the second rotor 12 and 12' continue to run. These operations are further summararized in Table II.

Figure 17:
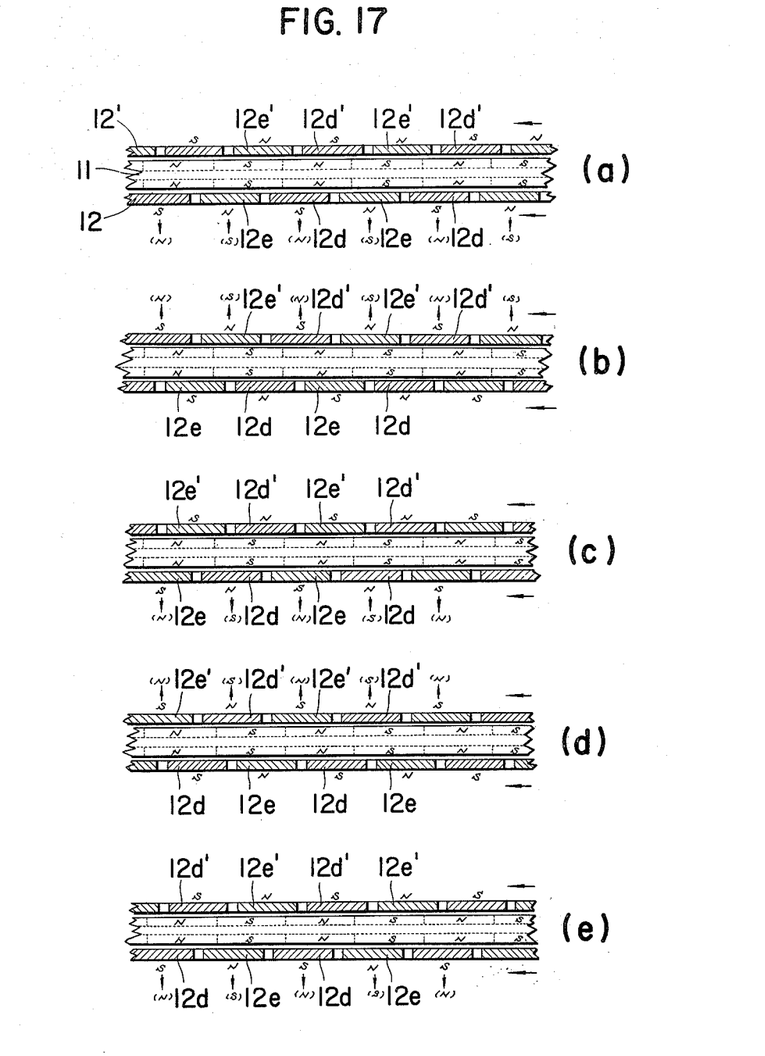
FIG. 17 is a diagram showing magnetic operation of the motor of FIG. 8 used as a pulse motor.

The rotors 12 and 12' then reach dynamically balanced positions and stall in the positions as shown in FIG. 17 (b).

In the region b - c, the second exciting coil 9' are de-energized between the taps 9b' and 9c' but energized by a pulse voltage newly applied across the taps 9b' and 9a', while the first coil 9 is still energized across the taps 9b and 9a at the point b. The polarities of the pole teeth 12d' and 12e' of the second rotor 12' are then changed to those in the parentheses as shown in FIG. 17 (b). Accordingly, the first rotor 12 runs in the leftward direction due to the attraction by the permanent magnet 11 and the second rotor 12' rotates in the same direction due to the repulsion by said permanent magnet 11 by further ½ pole pitch of the permanent magnet 11 to dynamically balanced stable positions where the rotors 12 and 12' stall as shown in FIG. 17 (c).

In the region c - d, the first exciting coil 9 is de-energized between the taps 9b and 9a but energized by a pulse voltage newly applied across the taps 9b and 9c at Table II

| operational region | conditions of exciting coils | | | | polarities induced in pole teeth | | | |
|---|---|---|---|---|---|---|---|---|
| | 9b–9a | 9b–9c | 9b'–9a' | 9b'–9c' | 12d | 12e | 12d' | 12e' |
| a – b | + | – | – | + | N | S | S | N |
| b – c | + | – | + | – | N | S | N | S |
| e – d | – | + | + | – | S | N | N | S |
| d –a' | – | + | – | + | S | N | S | N |
| a'–b' | + | – | – | + | N | S | S | N |
| b'–e' | + | – | + | – | N | S | N | S |

The rotational operation of the thus magnetized pole teeth 12d and 12e of the first rotor 12 and the pole teeth 12d' and 12e' of the second rotor 12' is explained hereunder referring to the operation diagram of FIGS. 17 (a) to (e), the pulse voltage as shown in FIG. 14 and the magnetized condition of the pole teeth as shown in Table II.

FIG. 17 (a) shows a condition before the point a of FIG. 16 wherein the pole teeth 12d and 12e of the first rotor 12 are magnetized in south and north, respectively, while the pole teeth 12d' and 12e' of the second rotor 12' are magnetized in south and north, respectively. In this condition, the pole teeth 12d and 12e get a repulsion and an attraction force in the rightward direction as viewed in FIG. 17 and on the other hand, the pole teeth 12d' and 12e' of the second rotor 12' receive a repulsion and an attraction force in the leftward direction. Accordingly, the first rotor 12 and the second rotor 12' fixed to the boss member 7 are in a dynamically balanced position and can not move in either direction, keeping the rotary shaft 1 to stand still.

In the region a - b, a pulse voltage is applied across the taps 9b and 9a of the first exciting coil 9 at the point a and a pulse voltage is still applied across the taps 9b' and 9c' of the second exciting coil 9'. The pole teeth 12d and 12e of the first rotor 12, then, change their polarities to those in the parentheses in FIG. 17 (a). As a result, the first rotor 12 advances in the leftward direction through the attraction by the permanent magnet 11 and the second rotor 12' rotates in the same direction due to the replusion by said permanent magnet 11 by ½ pole pitch of the permanent magnet 11.

the point c, while the second exciting coil 9' is still energized across the taps 9b' and 9a' at the point c so that the pole teeth 12d and 12e of the first rotor 12 change their polarities to those in the parentheses as shown in FIG. 17 (c). Accordingly, the first rotor 12 rotates in the leftward direction due to the repulsion by the permanent magnet 11 and the second rotor 12' rotates in the same direction through the attraction by said permanent magnet 11 by further ½ pole pitch of the permanent magnet 11. At the positions, the rotors 12 and 12' stall in dynamically balanced stable condition as shown in FIG. 17 (d).

In the region d - a', the polarities of the second rotor 12' are changed through similar operation to those in the parentheses as shown in FIG. 17 (d) and the rotors 12 and 12' further advance by ½ pole pitch of the permanent magnet 11 to stall in dynamically balanced stable positions as shown in FIG. 17 (e). Likewise, the rotors 12 and 12' advance in the leftward direction step by step by ½ pole pitch of the permanent magnet 11.

Figure 18:
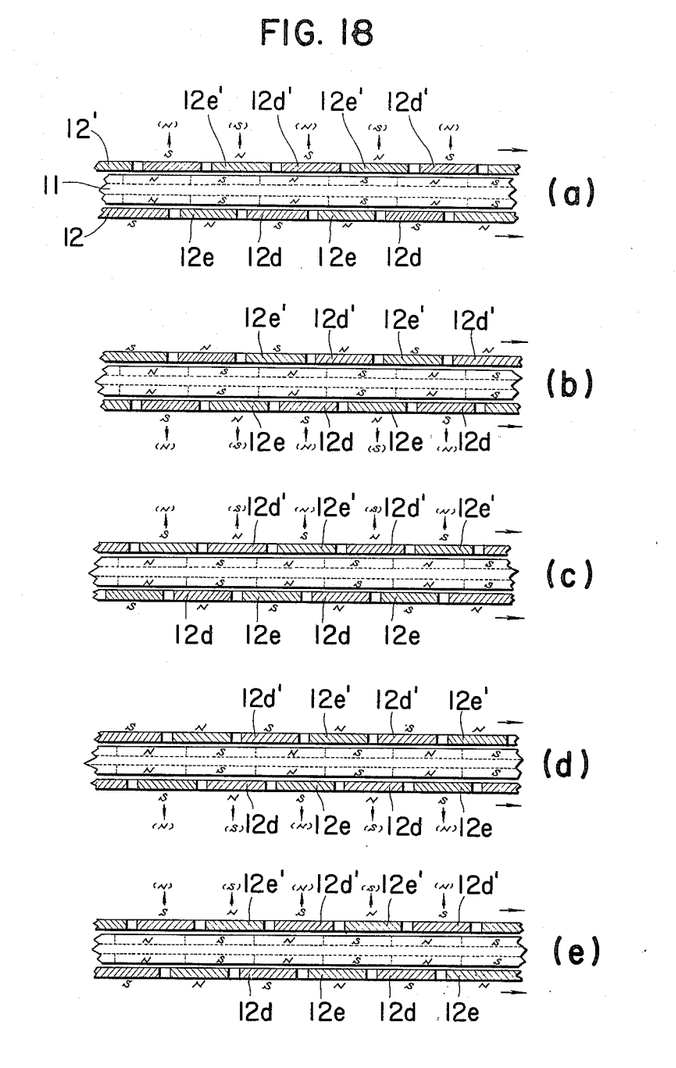
FIG. 18 is a similar diagram showing magnetic operation of the motor of FIG. 8 used as a pulse motor.

In order to rotate the rotors 12 and 12' in the opposite, to wit, rightward direction, the pulse voltage (III) of FIG. 16 is applied across the taps 9b and 9a of the first exciting coil 9 and the pulse voltage (IV) is applied across the taps 9b and 9c, while the pulse voltage (I) and the pulse voltage (II) are applied across the taps 9b' and 9a' and the taps 9b' and 9c', respectively. The energization operation and the magnetization operation under these conditions are shown in Table III and the resultant operation of the rotors 12 and 12' is shown in FIGS. 18 (a) to (e).

Table III

| operational region | conditions of exciting coils | | | | polarities induced in pole teeth | | | |
|---|---|---|---|---|---|---|---|---|
| | 9b–9a | 9b–9c | 9b'–9a' | 9b'–9c' | 12d | 12e | 12d' | 12e' |
| a – b | − | + | + | − | S | N | N | S |
| b – c | + | − | + | − | N | S | N | S |
| c – d | + | − | − | + | N | S | S | N |
| d – a' | − | + | − | + | S | N | S | N |
| a'–b' | − | + | + | − | S | N | N | S |
| c'–d' | + | − | + | − | N | S | N | S |

In the region a - b of FIG. 16, the second exciting coil 9' is de-engergized between the taps 9b' and 9c' but energized by a pulse voltage applied across the taps 9b' and 9a', while the first exciting coil 9 is energized by a pulse voltage applied across the taps 9b and 9c at the point a. The polarities of the pole teeth 12d' and 12e' of the second rotor 12' are then changed to those in the parentheses as shown in FIG. 18 (a). As a result, the first rotor 12 and the second rotor 12' rotate in the rightward direction as viewed in FIG. 18 by ½ pole pitch of the permanent magnet 11. Then, the rotors 12 and 12' reach dynamically balanced stable positions to stall there as shown in FIG. 18 (b).

In the region b - c, the first exciting coil 9 is energized by a pulse voltage applied across the taps 9b and 9a, while the second exciting coil 9' is energized by a pulse voltage applied across the taps 9b' and 9a' at the point b. The polarities of the pole teeth 12d and 12e of the first rotor 12 are then changed to those in the parentheses as shown in FIG. 18 (b). Accordingly, the first rotor 12 and the second rotor 12' advance and then stall in positions as shown in FIG. 18 (c).

In the region c - d, the second exciting coil 9' is energized by a pulse voltage applied across the taps 9b' and 9c', while the first exciting coil 9 is energized by a pulse voltage applied across the taps 9b and 9a at the point c, so that the polarities of the pole teeth 12d' and 12e' of the second exciting coil 12' are changed to those in the paretheses as shown in FIG. 18 (c). As a result, the first rotor 12 and the second rotors 12' rotate in the rightward direction and then stall in the positions as shown in FIG. 18 (d).

In the region d - a', the first exciting coil 9 is energized by a pulse voltage applied across the taps 9b and 9c, while the second exciting coil 9' is energized by a pulse voltage applied across the taps 9b' and 9c' at the point d. The polarities of the pole teeth 12d and 12e of the first rotor 12 are then changed to those in the parentheses as shown in FIG. 18 (d). Then, the first rotor 12 and the second rotor 12' are caused to rotate rightwardly to the positions as shown in FIG. 18 (e). Thus, the rotors 12 and 12' continue to rotate step by step in the rightward direction through repitition of similar operation.

In the light of the foregoing description, every advance operation of the two-phase pulse motor is effected by distributing a pulse voltage to the four exciting coils according to necessity through the driving circuit 15 in response to every application of the input or control signal 17. In this connection, it is to be noted that the input signal 17 is not necessarily required to be a regular signal such as an AC sine-wave current or a constant and regular pulse signal. Even if the signal applied is occasionally constant or quick or occasionally intermittent or slow, the rotors of the present motor can surely advance by a predetermined rotational angle depending upon the number of the input signals and stall in a position for a predetermined period.

It will be understood that though a two-phase synchronous motor, reversible motor and pulse motor are illustratively explained above, the motor of the present invention may of couse be applicable to multi-phase motors of various types. The differences in electrical angles between respective motor members, which is formed in the foregoing embodiments by the angles between adjacent rotors, may be provided alternatively by staggering the poles of the magnetized faces of the permanent magnet. Further, two permanent magnets each magnetized only on one face may be employed as a stator instead of using a permanent magent which is magnetized on its opposite faces.

As mentioned above, according to the present invention, the pole teeth of the rotor are simultaneously magnetized in opposite polarities substantially all over the surface depending upon the magnetic flux produced by the annular exciting coil and subjected to a magnetic interference all over the confronting surface of the permanent magnet, much improving a magnetic efficiency thereby to enlarge repulsion and attraction force. Owing to this improvement, a rotor with large moment of inertia becomes employable to improve an output efficiency. In other words, the motor of the present invention can be driven by less input power as compared with a conventional motor using a rotor of the same moment of inertia.

Further owing to the improvement in magnetic efficiency, repulsion and attraction forces are increased so that the rotor of the present invention can respond to a much higher frequency than a conventional rotor of the same moment of inertia, thus improving frequency response very much.

What is claimed is:

1. In an electric motor having a rotary shaft, a rotor made of a soft magnetic material and fixed to said rotary shaft in a concentric relation therewith, a permanent magnet stator concentric with said rotary shaft and magnetized radially to provide north and south poles alternating at equal angular spacings, a casing including a yoke made of a soft magnetic material and forming an alternating magnetic circuit with said rotor, and an annular exciting coil concentric with said rotary shaft and interposed between said rotor and said yoke of the casing; the improvement comprised in that said rotor has a circular portion lying in a radial plane through said shaft and facing the magnetized face of the permanent magnet stator, said rotor further having high magnetic reluctance means circumferentially dividing said circular portion into a plurality of the pole teeth and magnetically separating each said pole tooth from the adjacent ones of said pole teeth, said rotor further having magnetic path means for simultaneously magnetizing adjacent pole teeth with opposite magnetic polarities in response to the magnetic field produced in said coil and for alternating the magnetic polarity of said pole teeth in response to alternation of said magnetic field, said magnetic path means comprising inner and outer bent portions of said rotor flanking said circular portion.

2. An electric motor as set forth in claim 1, which further comprises a set of a further rotor and a further permanent magnet stator similar to but oriented opposite to the first mentioned said rotor and permanent magnet stator and located at the opposite end of the exciting coil, said permanent magnet stators being staggered from each other by an electrical angle of 180°.

3. An electric motor as set forth in claim 1 in which said high magnetic reluctance means comprises a set of L-shaped portions of high magnetic reluctance distributed circumferentially on said rotor circular portion, each said L-shaped portion having a substantially radial leg extending between said inner and outer bent portions of said rotor and a circumferential leg extending circumferentially from the end of its radial leg near one of said inner and outer bent portions of said rotor, the circumferential legs of all said L-shaped portions extending in the same circumferential direction from their respective radial legs, alternate ones of said L-shaped portions having their circumferential legs adjacent said outer bent portion of said rotor and the remaining ones of said L-shaped portions having their circumferential legs adjacent said inner bent portion of said rotor.

4. An electric motor as set forth in claim 3, in which the radial leg of each L-shaped portion circumferentially and magnetically separates an adjacent pair of said pole teeth from each other, the free end of each said circumferential leg being at least circumferentially closely adjacent to the free end of the radial leg of the next L-shaped portion to at least substantially magnetically separate the adjacent end of the intervening pole tooth from the adjacent one of said inner and outer rotor bent portions so as to substantially eliminate any magnetic path between said tooth end and adjacent bent portion, the free end of the radial leg of each L-shaped portion being relatively widely spaced circumferentially from the leg joining apex of the next L-shaped portion and therewith providing therebetween a substantial magnetic path from the intervening pole tooth to the adjacent rotor bent portion.

5. An electric motor as set forth in claim 4, in which said L-shaped portions all have radial legs of similar length but alternating L-shaped portions have circumferential legs substantially shorter than the circumferential legs of the remaining ones of said L-shaped portions, the circumferential width of said rotor pole teeth being substantially the same and substantially exceeding the width of said legs.

6. An electric motor as set forth in claim 1, in which said inner and outer bent portions of said rotor comprise radially inner and outer annular flanges axially extending from said rotor circular portion respectively at radially inner and outer perimetral edges thereof, said rotor circular portion being an annular disk, said high magnetic reluctance means being L-shaped slots extending through the thickness of said disk, the circumferential legs of said slots lying immediately adjacent and along the corresponding rotor axial flanges.

7. An electric motor as set forth in claim 1, in which alternate pole teeth are integral with said outer bent portion and the remaining pole teeth are integral with said inner bent portion, so as to provide radially inner and outer circumferential rows of interfingered coplanar pole teeth extending between said bent portions and in which at a given rotative position of the rotor, each pole of the permanent magnet stator faces a corresponding pole tooth of the rotor, and in which the facing areas of the rotor pole teeth and stator permanent magnet poles are substantially the same.

8. An electric motor as set forth in claim 2, in which said inner and outer bent portions of said rotors each comprise an annular flange axially extending from the corresponding one of the radially inner and outer edges of said rotor circular portion, such circular portion being formed as an annular disc, the circular portions of the two rotors axially flanking a single annular exciting coil, said rotor circular portions in turn being axially flanked by said two permanent magnet stators, each said rotor having circumferentially alternating ones of its pole teeth connected by a circumferentially wide magnetic path to the radially inner rotor flange and having its remaining pole teeth each connected through a wide magnetic path to the radially outer of said rotor flanges, the inner and outer flanges of each rotor, and the axially opposed flanges of the two rotors, extending in opposite axial directions.

9. An electric motor comprising a rotary shaft; a casing including a yoke of a soft magnetic material; and a plurality of motor members each including a permanent magnet stator concentric with said rotary shaft and magnetized radially to provide north and south poles alternating at equal angular spacings, an annular exciting coil concentric with said rotary shaft actuable for forming an alternating magnetic field, and a rotor of a soft magnetic material for forming an alternating magnetic circuit with said yoke of the casing, said rotor being fixed to said rotary shaft in a concentric relation therewith and provided with a circular portion lying in a radial plane through said shaft facing the magnetized face of the permanent magnet stator, said rotor further having high magnetic reluctance means circumferentially dividing said circular portion into a plurality of pole teeth and magnetically separating each said pole tooth from the adjacent ones of said pole teeth, said rotor further having magnetic path means for simultaneously magnetizing adjacent pole teeth with opposite magnetic polarities in response to the magnetic field produced in said coil and for alternating the magnetic polarity of said pole teeth in response to alternation of said magnetic field, said magnetic path means comprising inner and outer bent portions of said rotor flanking said circular portion.

10. An electric motor as set forth in claim 9, wherein each adjacent two motor members are in positions staggered from each other by a predetermined electrical angle.

11. An electric motor as set forth in claim 9, wherein to each annular exciting coil is applied a voltage of the same phase.

12. An electric motor as set forth in claim 9, wherein to each annular exciting coil is applied a voltage of different phase.

13. An electric motor as set forth in claim 9, in which said inner and outer bent portions of each said rotor comprise circumferentially continuous axially extending flanges which are coaxial with each other and radially spaced apart by said circular portion of said rotor, alternate ones of said rotor pole teeth extending integrally and radially outward and divergently from said inner flange and terminating substantially at said outer flange, the remaining ones of said rotor pole teeth extending integrally and radially inward and convergently from said outer flange in coplanar relation with said alternate pole teeth, said high magnetic reluctance means comprising narrow strip-like high magnetic reluctance portions circumferentially magnetically separating adjacent pole teeth and radially magnetically separating the free radial ends of such pole teeth from the opposed ones of said flanges.

14. An electric motor as set forth in claim 13, in which a pair of said motor members share a common said coil, said pair of motor members have rotors axially flanking said common coil with their radially inner flanges pointed toward each other and the radially outer flanges pointed away from each other, said pair of rotors in turn being axially flanked by the permanent magnet stators of said pair of motor members, said inner flanges being commonly joined to said rotary shaft and said outer flanges radially facing the outer edges of said permanent magnet stators.

15. An electric motor as set forth in claim 13, wherein a pair of said motor members share a common permanent magnet stator substantially of annular disc form, the rotors of said pair of motor members each with its radially inwardly and radially outwardly extending pole teeth axially flanking said permanent magnet stator, the inner and outer flanges of said rotors extending in opposite axial directions, said coils of said pair of motor members in turn axially flanking the central portions of said rotors in overlapped relation with both the radially inwardly and radially outwardly extending pole teeth thereof and lying between the axial flanges of the corresponding rotor.

* * * * *